Andrew Henderson
Harry Percival Harvey Anderson
INVENTOR

Patented Apr. 21, 1931

1,802,112

UNITED STATES PATENT OFFICE

ANDREW HENDERSON, OF TEDDINGTON, AND HARRY PERCIVAL HARVEY ANDERSON, OF TOLWORTH SURBITON, ENGLAND

REDUCTION SPEED GEAR

Application filed April 28, 1930, Serial No. 447,830, and in Great Britain April 29, 1929.

This invention relates to improvements in reduction gears, and has for its chief object to provide a simple yet highly efficient reduction gear. The reduction gear, according to this invention, may in certain circumstances be made variable, as will hereinafter be described, and in this form the reduction gear according to this invention has the advantage that the variation is obtained without employing a friction drive, whereby a high mechanical efficiency is maintaned. Further, the device may be arranged to operate as a variable speed and reversing gear, if desired.

According to this invention, the reduction gear comprises a pair of bevel wheels rotated in opposite directions and at different speeds by the driving shaft and one or more epicyclic bevel wheels carried by the driven shaft engaging with said bevel wheels, the difference of speed between the two bevel wheels being transmitted through the epicyclic bevel wheel (or wheels) to the driven shaft.

In the preferred form of gear according to this invention, there is provided a casing within which are rotatably mounted a pair of double bevel gears each engaging with a bevel pinion and each adapted to drive an epicyclic bevel gear carried by the driven shaft, the two bevel pinions being secured to the same shaft and being adapted to rotate the double bevel gears in opposite directions and at different speeds.

Means may also be provided to vary the relative speeds of rotation of the bevel pinions in order to secure a variable speed gear, and the device may be modified as hereinafter described to comprise a variable speed and reversing gearing.

In order that this invention may be more clearly understood, reference may be made to the accompanying drawings which illustrate convenient constructional forms of this invention by way of example only, and in which Figure 1 is a sectional view of a fixed reduction gear according to this invention.

Figure 1:
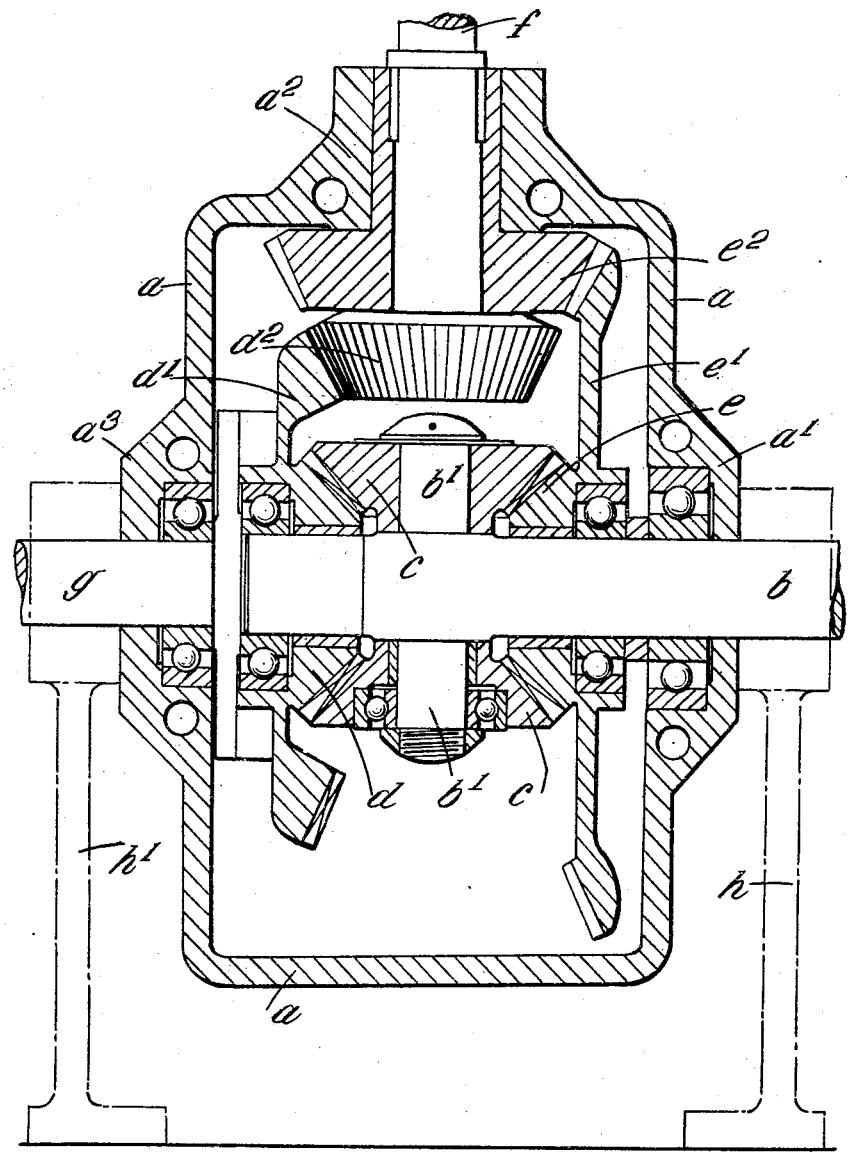

Referring now to Figure 1 of the accompanying drawings, the reduction gear there-in illustrated is adapted to give a fixed reduction and comprises a casing or cage $a$ provided with the driven shaft $b$ which extends through a bearing $a^1$ in the cage and is provided inside the cage with two diametrically opposite integral or fixed trunnions $b^1$. Freely rotatable on these trunnions $b^1$ are two equal bevel wheels $c$ each engaging with two further bevel wheels $d$ and $e$ freely rotatable on the driven shaft $b$. The bevel wheel $d$ is integral with or secured to a further bevel wheel $d^1$ and the bevel wheel $e$ is likewise connected to a bevel wheel $e^1$. The bevel wheel $d^1$ is provided with a lesser number of teeth than the bevel wheel $e^1$ and these two bevel wheels are engaged by bevel wheels $d^2$ and $e^2$ respectively, the said bevel wheels $d^2$ and $e^2$ being each secured to a common shaft $f$ which extends through a bearing $a^2$ in the cage $a$.

In use, the shaft $f$ comprises the driving shaft, and the shaft $b$ the driven shaft. When the shaft $f$ is rotated either by power or by hand, the bevel wheels $d^2$ and $e^2$ drive the wheels $d^1$ and $e^1$ respectively in opposite directions and at different speeds. The wheels $d$ and $e$ are, therefore, rotated at different speeds and in opposite directions, and since the bevel wheels $c$ engage with both the wheel $d$ and the wheel $e$, the bevel wheels will have to move round in order to compensate for the different speeds. The wheels $c$ will roll round at a speed corresponding to half the difference of the number of teeth between the wheels $d^1$ and $e^1$, as will readily be seen. The movement of the wheels $c$ around the gears $d$ and $e$ will, as will readily be appreciated, cause the reduction or driven shaft $b$ to rotate a similar amount. In this manner we are enabled to obtain a high reduction of speed without appreciable loss of mechanical efficiency. In all cases with the gear above described the reduction will correspond to one half of the difference in the number of teeth between the bevel wheels $d^1$ and $e^1$.

It will be seen that the driving shaft $f$ and the driven shaft $b$ are arranged at right angles to each other. If it is desired to have the driving and driven shaft in line with each other this may be carried out by providing the cage $a$ with a bearing $a^3$ opposite the bearing $a^1$, a shaft $g$ passing through this bearing and being secured to the bevel wheel $d^1$ as shown. In this case the bevel wheel $d^2$ will be driven by the bevel wheel $d^1$ instead of the bevel wheel $d^1$ being driven by the bevel wheel $d^2$; otherwise the operation of the gear remains the same as above described.

In some cases it may be desirable to take the drive from the cage $a$ and in this case the shaft $b$ may be held stationary by a standard $h$ while the shaft $g$ is carried by a bearing $h^1$. The cage will then rotate about the shaft $g$.

Many modifications may be made in the above described constructional form without departing from the spirit of this invention; thus, it may be desired to obtain a variable speed reduction. This variable speed reduction may advantageously be secured by separating the bevel wheels $d^2$ and $e^2$ and providing means for controlling their relative speeds of rotation. One convenient method of securing this control of the relative rotation of the bevel wheels $d^2$ and $e^2$ is shown in Figures 2 and 3 of the accompanying drawings.

Figure 2:
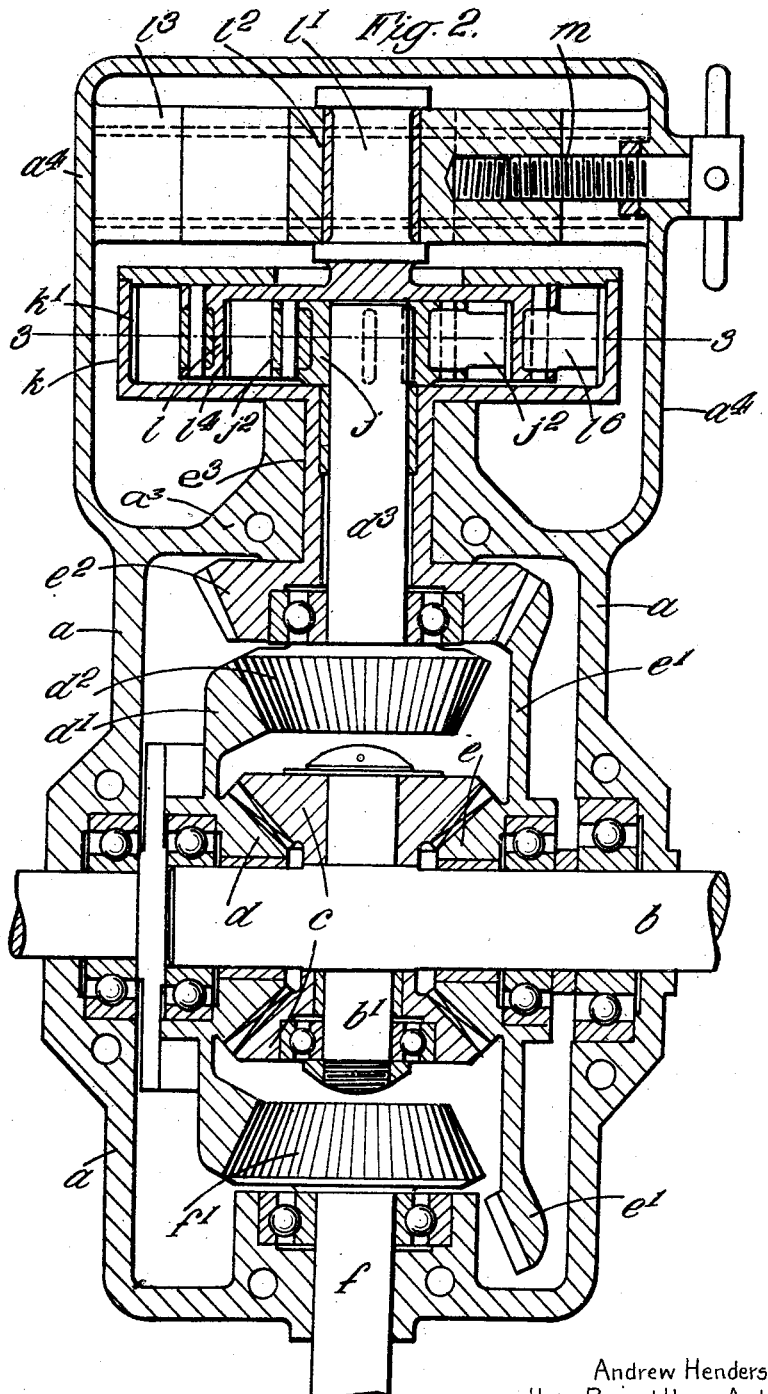
Figure 2 is a similar view showing a modified form of the invention by means of which a variable reduction may be obtained.
Figure 3:
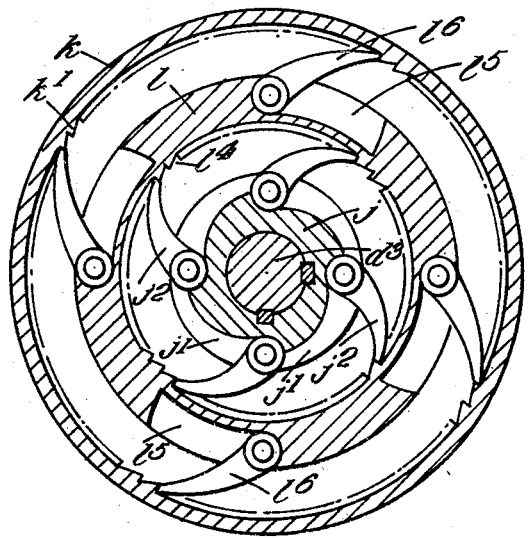
Figure 3 is a section on line 3—3 of Figure 2.

Referring now to Figures 2 and 3 of the accompanying drawings, the main part of the gear is substantially the same as that described with reference to Figure 1 and like reference letters have been employed to designate like parts. Since, however, the two bevel wheels $d^2$ and $e^2$ are no longer secured to a single shaft, the right angle drive is transferred to the opposite side of the cage, as shown, and the shaft $f$ is provided with a bevel wheel $f^1$ engaging with the bevel wheel $d^1$.

The cage $a$ is provided with an extension $a^4$, and the two bevel wheels $d^2$ and $e^2$ are each provided with separate shafts $d^3$ and $e^3$ respectively, the shaft $d^3$ being freely rotatable within the shaft $e^3$ as shown.

The shaft $d^3$ extends into the extension $a^4$ of the cage $a$ and is provided with a disc $j$. The shaft $e^3$ similarly extends through the bearing $a^3$ into the extension $a^4$ of the cage and is provided within the extension with a cup-shaped member $k$ surrounding the disc $j$ and provided on its internal periphery with ratchet teeth $k^1$. Arranged between the periphery of the cup-shaped member $k$ (hereinafter referred to as the "outer ring") and the disc $j$ is a ring $l$ secured to a shaft $l^1$ which is rotatably carried in a bearing $l^2$, the said bearing being slidably mounted in a slide $l^3$ extending diametrically across the extension $a^4$ of the cage, an adjusting screw $m$ passing through the wall of the extension $a^4$ and screwing into the bearing $l^2$ being provided to adjust the position of the bearing $l^1$ and hence the position of the ring $l$ relative to the outer ring $k$ and the disc $j$.

The internal periphery of the ring $l$ is provided with ratchet teeth $l^4$ similar to the teeth $k^1$ on the outer ring $k$ and the disc $j$ is provided with a number of recesses $j^1$ within which are pivoted spring-controlled pawls $j^2$, conveniently four such recesses $j^1$ are provided and each is of sufficient size to accommodate the pawls $j^2$. The pawls $j^2$ are curved to the curvature of the disc $j$ so that when the pawls are all located in the recesses the periphery of the disc $j$ is substantially uninterrupted. The springs controlling the pawls $j^2$, however, tend to move the pawls until they assume a position, as shown in Figure 3, in which they project substantially radially from the disc $j$ and engage with the ratchet teeth $l^4$ on the internal periphery of the ring $l$.

The outer periphery of the ring $l$ is similarly provided with, say, four recesses $l^5$ within which are pivoted spring-controlled pawls $l^6$ normally engaging with the teeth $k^1$ on the inner periphery of the outer ring $k$ in the manner described above.

Consider now the operation of the device, with the ring $l$ arranged centrally as shown in Figures 2 and 3, the pawls $j^2$ will all be in engagement with the teeth $l^4$ on the inner ring $l$ and similarly the pawls $l^6$ will all be in engagement with the teeth $k^1$. Rotation of the shaft $d^3$ will then be transferred through the pawls $j^2$ to the ring $l$ and through the pawls $l^6$ to the outer ring $k$. The whole device will then rotate as a single unit and the shafts $d^3$ and $e^3$ may be regarded as being locked together. In this position the device operates as above described with reference to Figure 1 and a reduction will be obtained.

Figure 4:
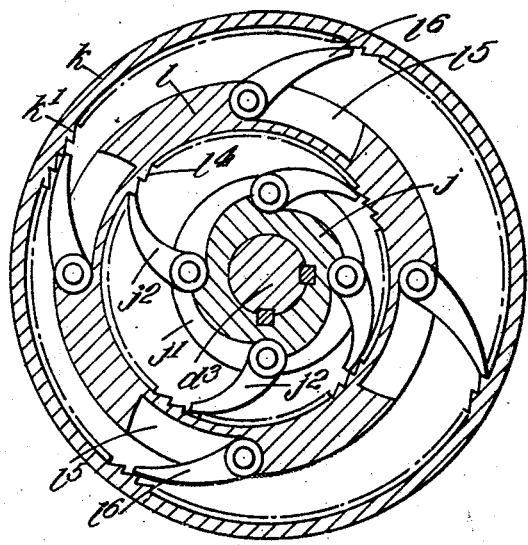
Figure 4 is a view similar to Figure 3 showing the parts in a different position.

Consider now the case in which the screw $m$ is operated to displace the ring $l$ between the disc $j$ and the outer ring $k$ and to render the same eccentric, as shown in Figure 4.

It will now be seen that only that pawl which has the maximum distance between the disc $j$ and the ring $l$ (and the ring $l$ and the outer ring $k$) to span is in engagement with the teeth. The drive is, therefore, taken by this pawl (or more than one) while the other pawls trail over the ratchet teeth. The shaft $d^3$ rotates as before and drives the disc $j$, but it will be seen that the distance between a certain part of the disc $j$ and the ring $l$ has increased, similarly on the other side of the disc $j$ the distance has decreased. The drive, as above explained, is only taken by the pawl lying in that part where the distance between the two parts is greatest. This distance being greater than the radius of the ring $l$, the ring $l$ will be rotated at a greater speed than when the parts are in the position shown in Figure 3. The centre of rotation of the ring $l$ (the shaft $l^1$) has been displaced but, due to the slide bearing $l^2$, $l^3$, it is prevented from taking up an epicyclic movement about the disc $j$. As, therefore, that pawl which is engaging the teeth approaches that part where the distance between the disc and the ring becomes less, it will begin to flatten out and will continue to flatten out, still maintaining the drive until the following pawl lies in a space which is greater than that occupied by the driving pawl. That pawl will then no longer drive, but the drive will be taken up by the following pawl. So each pawl in turn takes up the drive and, after driving the ring $l$ round through approximately one quarter of a turn, it releases the drive which is immediately taken up by the following pawl. The non-driving pawls, which are flattened out to a greater or less extent, depending upon their position (see Figure 4), slip over the ratchet teeth. There is, however, always one pawl in engagement with the ratchet teeth so that there is never any actual slip in the drive.

In this manner the ring is rotated at a greater speed without any appreciable loss of mechanical efficiency.

The ring $l$ is also disposed eccentric with respect to the outer ring $k$ and hence the pawls $l^6$ will take up the drive from time to time in the same manner as the pawls $j^2$ described above.

The outer ring $k$ will thus again be rotated faster and there is a double step-up speed ratio between the disc $j$ and the outer ring $k$.

Since the outer ring is connected through the shaft $e^3$ to the bevel wheel $e^2$, this wheel will be caused to rotate faster than the wheel $d^2$ and hence the bevel wheel $e$ will rotate faster than the bevel wheel $d$. The epicyclic bevel wheels $c$ will travel through a greater distance and more rotation will be applied to the driven shaft $b$. The reduction ratio will thus be less.

If the two bevel wheels $d^1$ and $e^1$ are provided with the same number of teeth, as they may conveniently be in this construction, with the ring disposed concentrically between the disc $j$ and the outer ring $k$ both of the wheels $d$ and $e$ will be rotated at the same speed. The bevel wheels $c$ will thus rotate idly on the trunnions $b^1$ and no movement will be imparted to the driven shaft $b$. The gear is thus neutral or it may be described as having an infinitely large reduction ratio. As the ring $l$ is moved further and further out of centre between the disc $j$ and the outer ring $k$, the bevel wheel $e$ will be rotated faster and faster and the reduction will become less and less.

An advantageous result may, however, be obtained by providing the bevel wheel $e^1$ with a larger number of teeth than the bevel wheel $d^1$ while still maintaining the two bevel wheels $d^2$ and $e^2$ with the same number of teeth. In this case when the ring $l$ is concentrically arranged between the disc $j$ and the outer ring $k$ the bevel wheel $d^1$ will be rotating faster than the bevel wheel $e^1$. Hence as will be readily seen, a reverse drive will be imparted to the driven shaft $b$. As the ring $l$ is moved out of centre, the reverse reduction ratio will be increased as the bevel wheel $e^1$ is rotated faster until, for one particular position of the ring $l$, depending upon the difference in the number of teeth in the wheels $e^1$ and $d^1$, the two bevel wheels $d^1$ and $e^1$ will be rotating at the same speed. This is the neutral position referred to above and further displacement of the ring $l$ will give the decreasing forward reduction ratio in the manner described above. In this form the device comprises a variable speed and reversing gear.

It will be appreciated that any other means may be employed for obtaining the desired control of the variation of speed between the bevel wheels $d^2$ and $e^2$ and also certain other modifications, as will be obvious to those skilled in the art, may be made without departing from the spirit of this invention.

We claim:—

1. A variable speed reduction gear in which the driving shaft is provided with two pinion bevel wheels, one engaging a bevel wheel and the other gearing with epicyclic bevel wheels carried on trunnions on the driven shaft, a double bevel gear wheel being rotatably arranged on the driven shaft and adapted to be driven in the opposite direction to the pinion bevel wheel on the driving shaft, one part of said double bevel gear engaging with the epicyclic bevel gear carried by the driven shaft and the other part being engaged by a bevel wheel which is operatively connected to the bevel wheel driven by the pinion bevel wheel on the driving shaft, means being provided to control the relative speed of rotation of the two pinion bevel wheels in order that a variable speed reduction may be obtained.

2. A modification of the variable speed gear according to claim 1 in which the pinion bevel wheel secured to the driving shaft is adapted to be driven from a shaft disposed at right angles to the axis of rotation of said bevel gear, a bevel wheel being provided on said shaft at right angles engaging with said bevel wheel, substantially as described.

3. A reduction gear comprising a casing within which are arranged a pair of double bevel gears each engaging with a bevel pinion and each adapted to drive an epicyclic bevel gear carried by the driven shaft, the two bevel pinions being each secured to a separate shaft and adapted to rotate the double bevel gears in opposite directions and at different speeds, and means to vary the relative speed of rotation of said shafts.

4. A reduction gear, comprising a driving shaft and a driven shaft, a casing, a pair of double bevel gears within said casing, bevel pinions engaging said bevel gears, an epicyclic bevel gear carried by the driven shaft and adapted to be driven by said double bevel gears, separate shafts to which said bevel pinions are respectively secured, said shafts arranged one within the other, a disc having spring-controlled pawls carried by the centre shaft, a ring having ratchet teeth on its inner periphery carried by the outer shaft, and an intermediate ring having ratchet teeth on its inner periphery and pawls on its outer periphery displaceably disposed between said disc and said outer ring.

5. A reduction gear as claimed in claim 4, in which one of said double bevel gears has a greater number of teeth than the other double bevel gear.

In testimony whereof we have signed our names to this specification.

ANDREW HENDERSON.
HARRY PERCIVAL HARVEY ANDERSON.